US007852337B2

(12) United States Patent
Archer et al.

(10) Patent No.: US 7,852,337 B2
(45) Date of Patent: Dec. 14, 2010

(54) SCALABLE PROPERTY VIEWER FOR A MASSIVELY PARALLEL COMPUTER SYSTEM

(75) Inventors: Charles Jens Archer, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 11/676,808

(22) Filed: Feb. 20, 2007

(65) Prior Publication Data

US 2008/0201657 A1 Aug. 21, 2008

(51) Int. Cl.
*G06T 11/20* (2006.01)
*G06F 15/16* (2006.01)

(52) U.S. Cl. ............ 345/440; 345/440.1; 345/440.2; 345/441; 345/442; 714/4; 709/217; 709/226; 709/227

(58) Field of Classification Search ......... 345/440–442; 709/223, 217, 226–227; 714/4
See application file for complete search history.

(56) References Cited

U.S. PATENT DOCUMENTS 7,555,566 B2 * 6/2009 Blumrich et al. ............ 709/249
2004/0103218 A1 * 5/2004 Blumrich et al. ............ 709/249
2005/0235055 A1 * 10/2005 Davidson ................... 709/223

OTHER PUBLICATIONS http://www-unix.mcs.anl.gov/perfvis/software/viewers/index.htm, "Performance Visualization for Parallel Programs", pp. 1-5, printed Jul. 16, 2007.
http://www.nersc.gov/nusers/resources/software/ibm/xprofiler, IBM/SP Profiling Tool (Xprofiler), pp. 1-4, printed Jul. 16, 2007.

* cited by examiner

*Primary Examiner*—Jin-Cheng Wang
(74) *Attorney, Agent, or Firm*—Martin & Associates, LLC; Bret J. Peterson (57) ABSTRACT

A method and apparatus for a scalable property viewer for a massively parallel computer system. The property viewer includes a graphical user interface to allow the user to view different properties of the computer system with several different types of views. The different views provide the user with both logical and graphical representations of the properties being monitored and allows the user to link between a logical and physical view of the system. The GUI provides the user with a convenient way to view the elements of a large system and determine elements that are different. Different properties could be placed together in the same view with different colors to allow the user to see the interaction of multiple properties.

19 Claims, 7 Drawing Sheets

SCALABLE PROPERTY VIEWER FOR A MASSIVELY PARALLEL COMPUTER SYSTEM

BACKGROUND OF THE INVENTION

1. Technical Field

This invention generally relates to maintenance and support of a parallel computing system, and more specifically relates to an apparatus and method for a scalable property viewer on a massively parallel computer system.

2. Background Art

Efficient fault detection and recovery is important to decrease down time and repair costs for sophisticated computer systems. On parallel computer systems with a large number of compute nodes, a failure of a single component may cause a large portion, or the entire computer to be taken off line for repair.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

The Blue Gene/L supercomputer communicates over several communication networks. The 65,536 computational nodes are arranged into both a logical tree network and a 3-dimensional torus network. The logical tree network connects the computational nodes in a tree structure so that each node communicates with a parent and one or two children. The torus network logically connects the compute nodes in a three-dimensional lattice like structure that allows each compute node to communicate with its closest 6 neighbors in a section of the computer. The Blue Gene/L supercomputer is scalable such that a system can be operational without the full set of 64 racks. Each rack is logically 16×8×8 nodes connected together in the torus. A number of racks can be cabled together to complete the torus on a smaller scale (up to 64 racks) in the Blue Gene/L system.

In the prior art, the Blue Gene/L supercomputer incorporated a data collection mechanism in the service node that compiles information from all the nodes in the system such as the temperature at the nodes. The information is provided to system administrators in a tabular form. This information is used to monitor potential problems and troubleshoot system failures.

Thus, while the prior art provided a mechanism to view properties of the system, it did not provide a convenient and useful tool to view properties in a graphical form that is scalable as the size of the system changes. Without a way for system administrators to easily view and interpret properties of the full system, parallel computer administrators will continue to waste time and effort monitoring parallel computer systems.

DISCLOSURE OF INVENTION

An apparatus and method is described for a scalable property viewer for a massively parallel computer system. The property viewer includes a graphical user interface to allow the user to view different properties of the computer system with several different types of views. The different views provide the user with both logical and graphical representations of the properties being monitored and allows the user to link between a logical and physical view of the system. The GUI provides the user with a convenient way to view the elements of a large system and determine elements that are different. Different properties could be placed together in the same view with different colors to allow the user to see the interaction of multiple properties.

The examples and disclosure are directed to the Blue Gene architecture but extend to any parallel computer system with multiple processors.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

BEST MODE FOR CARRYING OUT THE INVENTION

The disclosure and claims herein are directed to a property viewer for a parallel computer system. The property viewer includes a graphical user interface to allow the user to view and monitor different properties of the computer system with several different types of views. The different views provide the user with both logical and graphical representations of the properties being viewed and allows the user to link between a logical and physical view of the system. The examples will be described with respect to the Blue Gene/L massively parallel computer being developed by International Business Machines Corporation (IBM).

Figures 1, 2:
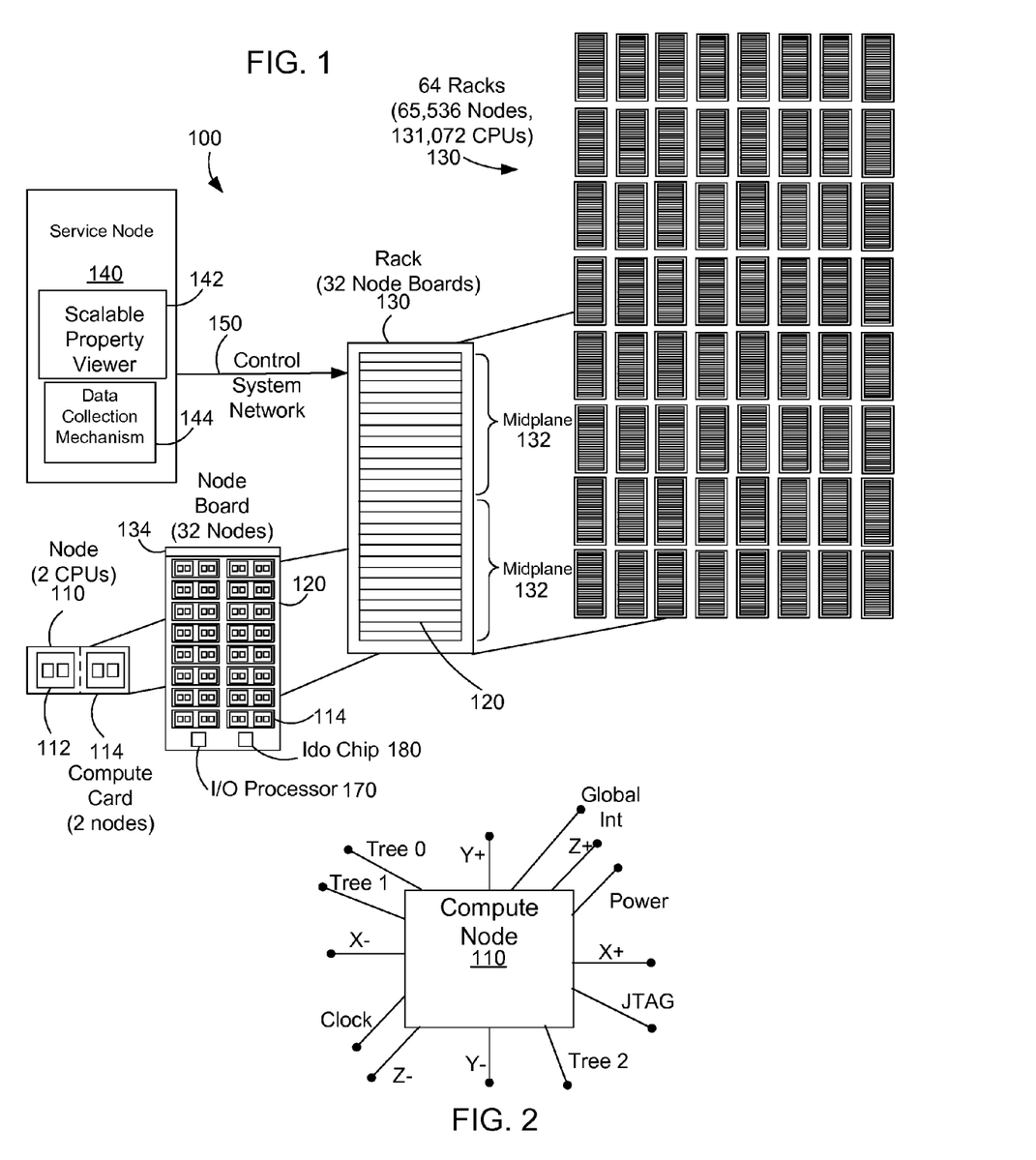
FIG. 1 is a block diagram of a massively parallel computer system.
FIG. 2 is a block diagram that shows the input and output connections of a compute node in a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112 which incorporates two processors or central processor units (CPUs). The node also typically has 512 megabytes of local memory (not shown). The compute chip and memory for two nodes are mounted on a node compute card 114. A node board 120 accommodates 16 node compute cards 114 each having two nodes 110. Thus, each node board has 32 nodes, with 2 processors for each node, and the associated memory for each processor. A rack 130 is a housing that contains 32 node boards 120 connected into two midplanes 132. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a functional network (not shown). The functional network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a scalable property viewer 142 that provides a graphical representation of properties of the nodes in the system such as temperature of each node. The scalable property viewer 142 comprises software in the service node 140 but may be assisted by a data collection mechanism 144 that may include software executing on the nodes of the system.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. The global interrupt network can thus be used to start, stop and pause an application running on a partition of nodes. Further, there are clock and power signals to each compute node 110.

The Blue Gene/L torus interconnect connects each node to its six nearest neighbors (X+, X−, Y+, Y−, Z+, Z−) in a logical 3D Cartesian array. The connections to the six neighbors is done at the node level, and at the midplane level. Each midplane is a 8×8×8 array of nodes. The six faces (X+, X−, Y+, Y−, Z+, Z−) of the node array in the midplane are each 8×8=64 nodes in size. Each torus network signal from the 64 nodes on each of the six faces is communicated through the link cards (not shown) connected to the midplane to the corresponding nodes in adjacent midplanes. The signals of each face may also be routed back to the inputs of the same midplane on the opposite face when the midplane is used in a partition with a depth of one midplane in any dimension.

Figure 3:
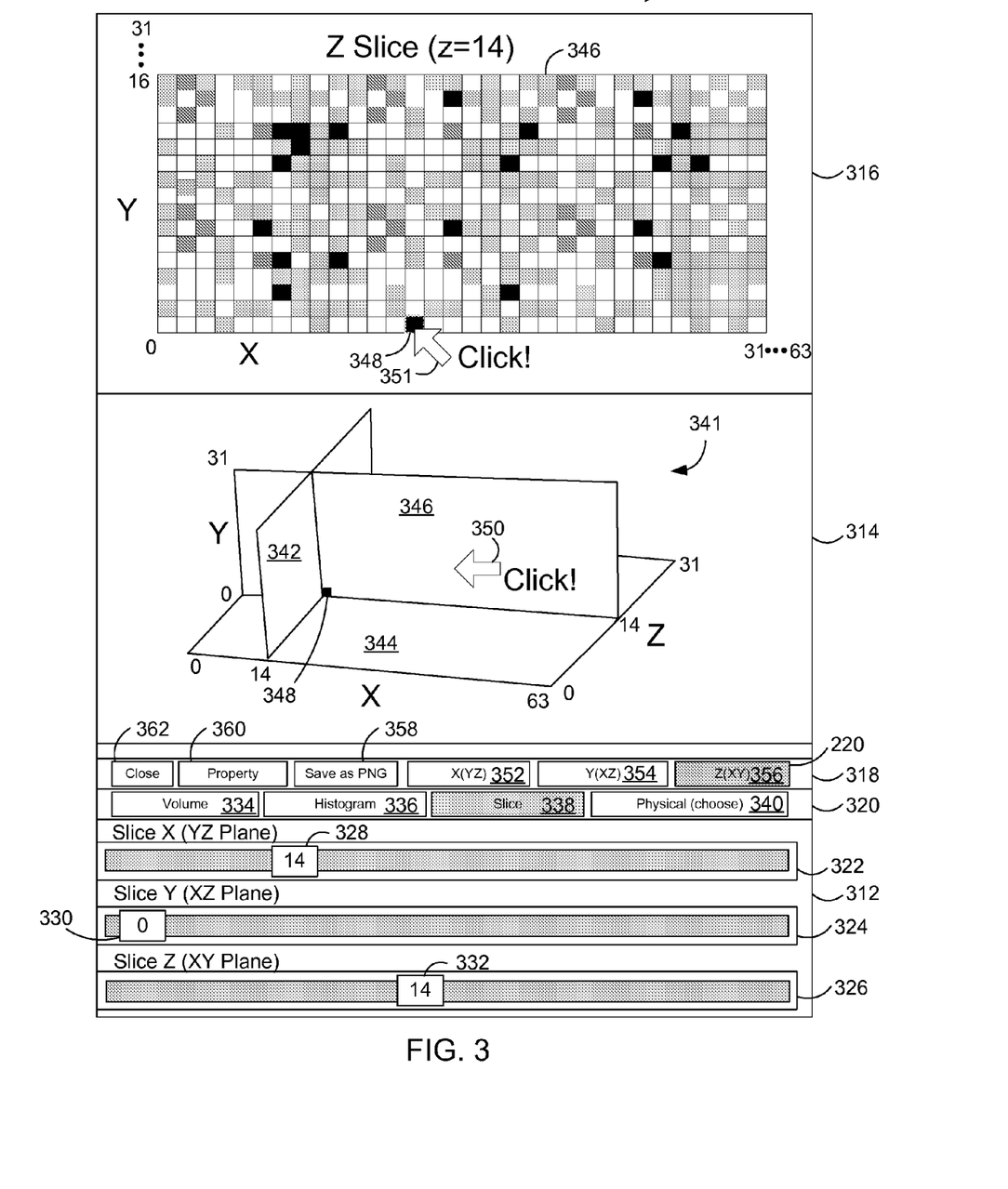
FIG. 3 represents a computer display screen with a property viewer with a slice view of a massively parallel computer system.

FIG. 3 represents a display screen of a computer system that is displaying a graphical user interface (GUI) 300 of a scalable property viewer (e.g., 142 in FIG. 1) for a parallel computer system. The GUI 300 includes a button screen 312, a property display area 314 and a slice display area 316. The button screen 312 includes a row of control buttons 318 and a row of view buttons 320. The button screen 312 also includes three slide controls 322, 324 and 326 with slide buttons 328, 330 and 332. The system administrator or computer user can select a button from the row of view buttons to determine which type of property view of the computer will be displayed in the property display area 314. The user can select between a volume view using the volume button 334, a histogram view using the histogram button 336, a slice view using the slice button 338 and a physical view using the physical view button 340. Each of these different types of views and their associated display screens will be described further below.

In the example illustrated in FIG. 3, the slice view 341, shown in the property display area 314, has been selected as indicated by the darkened slice button 338. The slice view 341 shows a logical slice of the system in each of the X, Y and Z planes as shown for a selected property. The slice in each plane is in the position as indicated by the slide buttons 328, 330 and 332 of the slide controls. In the illustrated example, the X slice 342 is at X=14 as indicated on the X slice button 328, the Y slice 344 is at Y=0 as indicated on the Y slice button 330, and the Z slice 346 is at Z=14 as indicated on the Z slice button 332. The surface of each plane is divided into a grid of property elements (not shown). Each property element on the surface of each plane represents a single node in the system at the logical position in the system corresponding to the X, Y and Z coordinates of the property element. The selected property (discussed below) such as temperature is displayed as a property element on the surface of the plane slices to give the user a graphical view of the property at the corresponding node in the parallel computer. The property variation such as temperature is reflected by the color of the property element. In the examples herein, the color of the property element is the greyscale or intensity from white to black; black being the higher temperature. Preferably, every property element on the face of each of the slices 342, 344, and 346 would be displayed; however the illustrated example shows only a single property element 348 on the Z slice 346 to simplify the drawing. The property elements are shown more completely in the slice display area 316.

Again referring to FIG. 3, slice display area 316 shows a single plane of the slice view shown in the property display area 314. In this example, slice display area 316 illustrates the Z=14 slice 346 shown in the property display area 314. Property element 348, corresponding to X=14, Y=0 and Z=14, is shown in property display area 314 and in slice display area 316. The property element 348 can be selected with the cursor to highlight the element and then switch to the physical view as described further with reference to FIG. 8 below. The Z=14 slice is 64×32 elements in the XY plane, but the slice has been reduced to 32×16 elements to simplify the drawing. In an actual computer display screen, the entire slice could be displayed to show all the property elements, or a partial screen could be displayed with slide bars or a zoom feature to allow the user to focus on a portion of the slice display. The X, Y or Z slice shown in the property display area 314 can be displayed in the slice display 316. The slice displayed can be chosen by using a pointer such a mouse to select the plane as shown 350, or by using one of the plane select keys 352, 354, and 356 in the row of control buttons 318.

FIG. 3 also has some additional control buttons in the row of control buttons 318. A "save as PNG" button 358 allows the user to save the current display as a graphical display file in the .png format as know in the prior art. The property key 360 allows the user to select the property to display on the screen. In the illustrated example, the property being displayed is temperatures of the nodes. Other properties that could be selected include cache misses, cache hits, FLOPS (floating operations per second), network traffic and could also include any other property that is available or monitored by the system.

As introduced above, the property viewer is scalable to accommodate the scalable computer system. The size of the system is shown as a range of values on the X, Y and Z axis. The system illustrated in FIG. 3 is 64×32×32 as shown by the 0 to 63 in the X dimension, and 0 to 31 in the Y and Z dimensions. These dimensions correspond to the overall size of the Blue Gene/L system. When the Blue Gene/L system is scaled to a fewer number of racks, the property viewer can easily be scaled to fit the new dimensions, and the property viewer could even be coded to autonomically scale for the current system configuration. The other views in the property viewer are similarly scaled to the size of the computer system.

Figure 4:
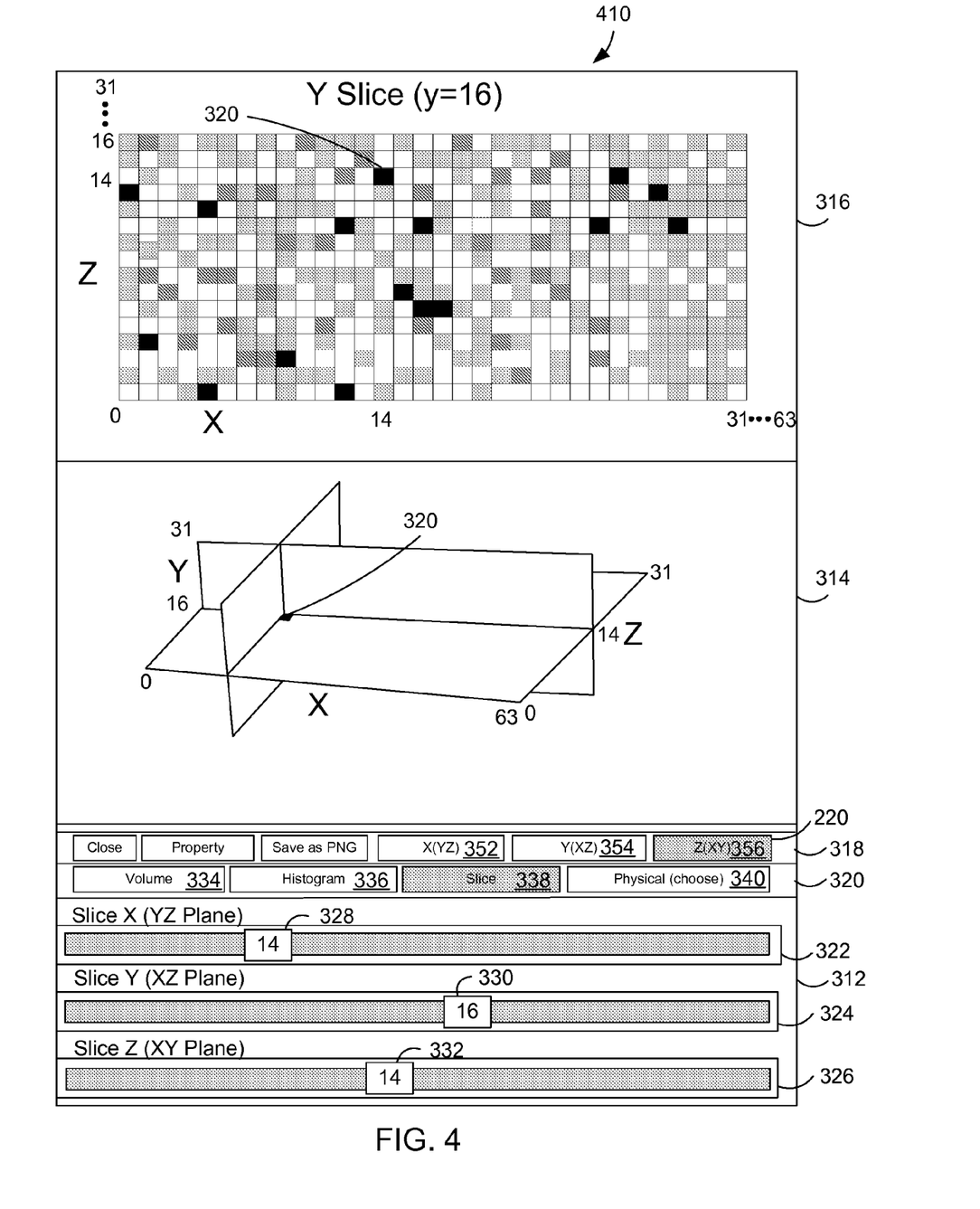
FIG. 4 represents a computer display screen with a property viewer with another slice view of a massively parallel computer system.

FIG. 4 represents another display screen of a computer system that is displaying a GUI 410 of a scalable property viewer for a parallel computer system. The example display in FIG. 4 shows a variation of the display represented in FIG. 3. In this example, the user has made two changes to the display. First, the Y slice has been selected as illustrated by the greyed Y slice button 354. The Y slice in therefore displayed in the slice display area 316. Also, the user has moved the Y slice button 330 to Y=16 as shown. A single property element 410 on the Y slice and in the XZ plane is shown in the property display 314. The same property element is shown in the corresponding Y slice in the slice display 316. As discussed above, on an actual computer display screen, all the property elements on all the slices shown in the property display area 314 could be illustrated, but all the property elements are not shown on the simplified drawings.

Figure 5:
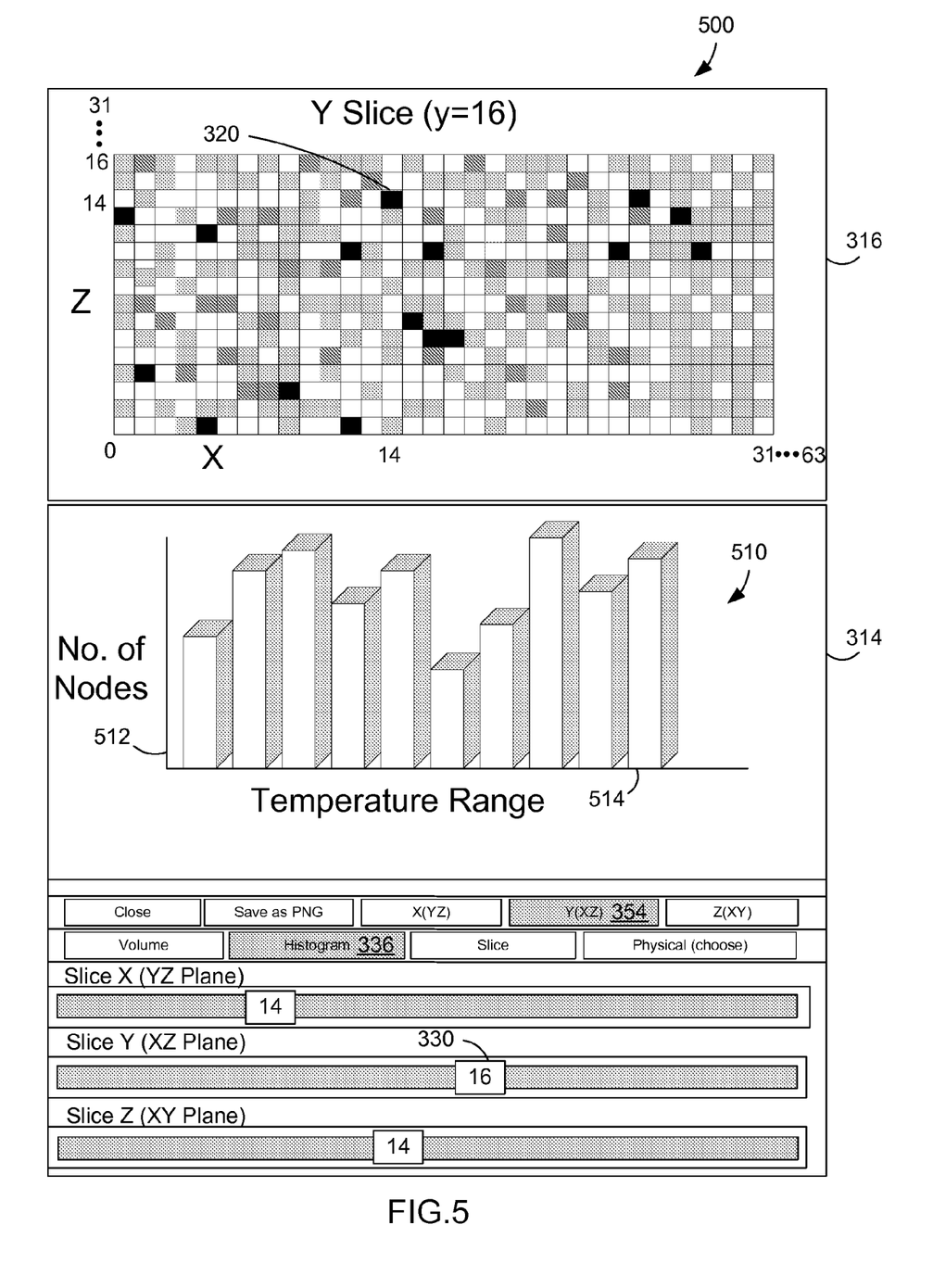
FIG. 5 represents a computer display screen with a property viewer showing a histogram view of a massively parallel computer system.

FIG. 5 represents another display 500 of a scalable property viewer for a parallel computer system. In the example of FIG. 5, the histogram view has been selected as indicated by the darkened histogram button 336. The histogram view 510 is then displayed in the property display area 314. The histogram view 510 for the temperature property shows the number of nodes on the y-axis 512 in each of a number of temperature ranges on the x-axis 514. The histogram view 510 is for the currently selected slice (y=16) as indicated by the plane select key 354 and slice slide button 330.

Figure 6:
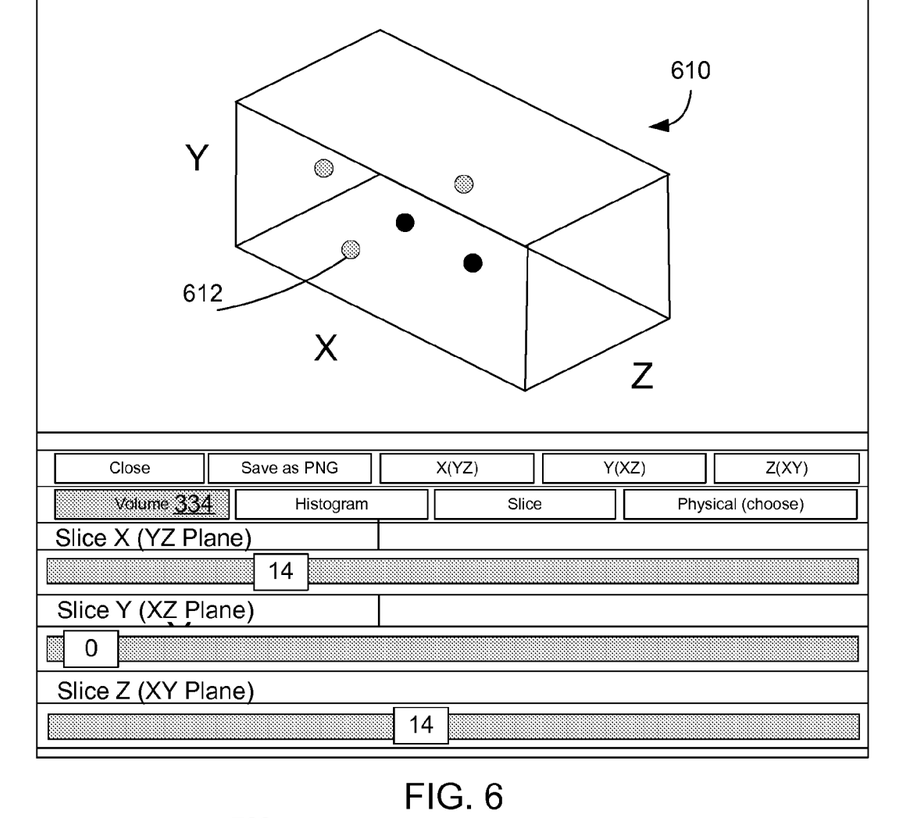
FIG. 6 represents a computer display screen with a property viewer showing a volume view of a massively parallel computer system.

FIG. 6 shows the volume view 610 in the property display area 314 of a scalable property viewer for a parallel computer system. The volume view is indicated by the darkened volume button 334. The volume view 610 represents the entire system as a cloud of nodes represented by property elements 612. In FIG. 6, only a few nodes 612 are shown to simplify the drawing. In a typical system, there would be a smaller property element 612 for each node. The property elements may be displayed in a range of colors to indicated the range of the property. For example, the temperature of the nodes may be indicated by various colors of property elements 612. Further, it may be advantageous to have elements that are of an average or nominal temperature to appear as transparent or almost transparent of a light color so only problem nodes would be readily visible as indicated by a darker color and/or non-transparent color. In this way, the volume view offers a quick overview of the entire system that may contain a very large number of nodes, and with a color scheme as discussed allows a quick way to find nodes that are different from the other nodes. The volume view can incorporate a zoom feature to allow the user to zoom in on a node using a pointer and/or allow the user to zoom in on the problem nodes by using the slice view described above. Further, the user can select a node and change to the physical view and display the status of a node as described below.

Figure 7:
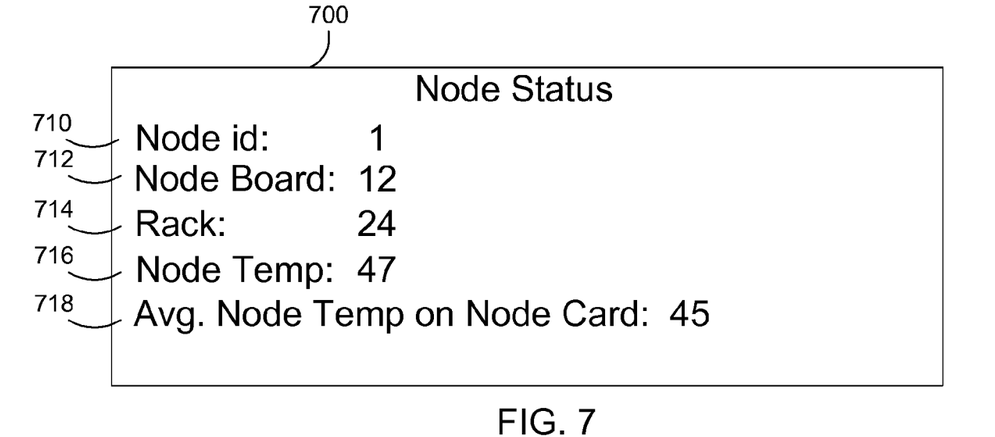
FIG. 7 represents a computer display screen with a property viewer showing the status of a compute node on a massively parallel computer system.

FIG. 7 illustrates a node status view 700 of a scalable property viewer for a parallel computer system. The node status view is activated by selecting a property element in the other views and double clicking the mouse or some other similar user input. The node status view 700 includes various information for a selected node. In the illustrated example shown in FIG. 7, the node status view 700 includes the nodeid 710, the Node board 712 that holds the compute card corresponding to the nodeid 710, the rack 714 that contains the node card 712, the node's temperature 716, and the average node temperature 718 on the node board 712. Other status information could also be displayed.

Figure 8:
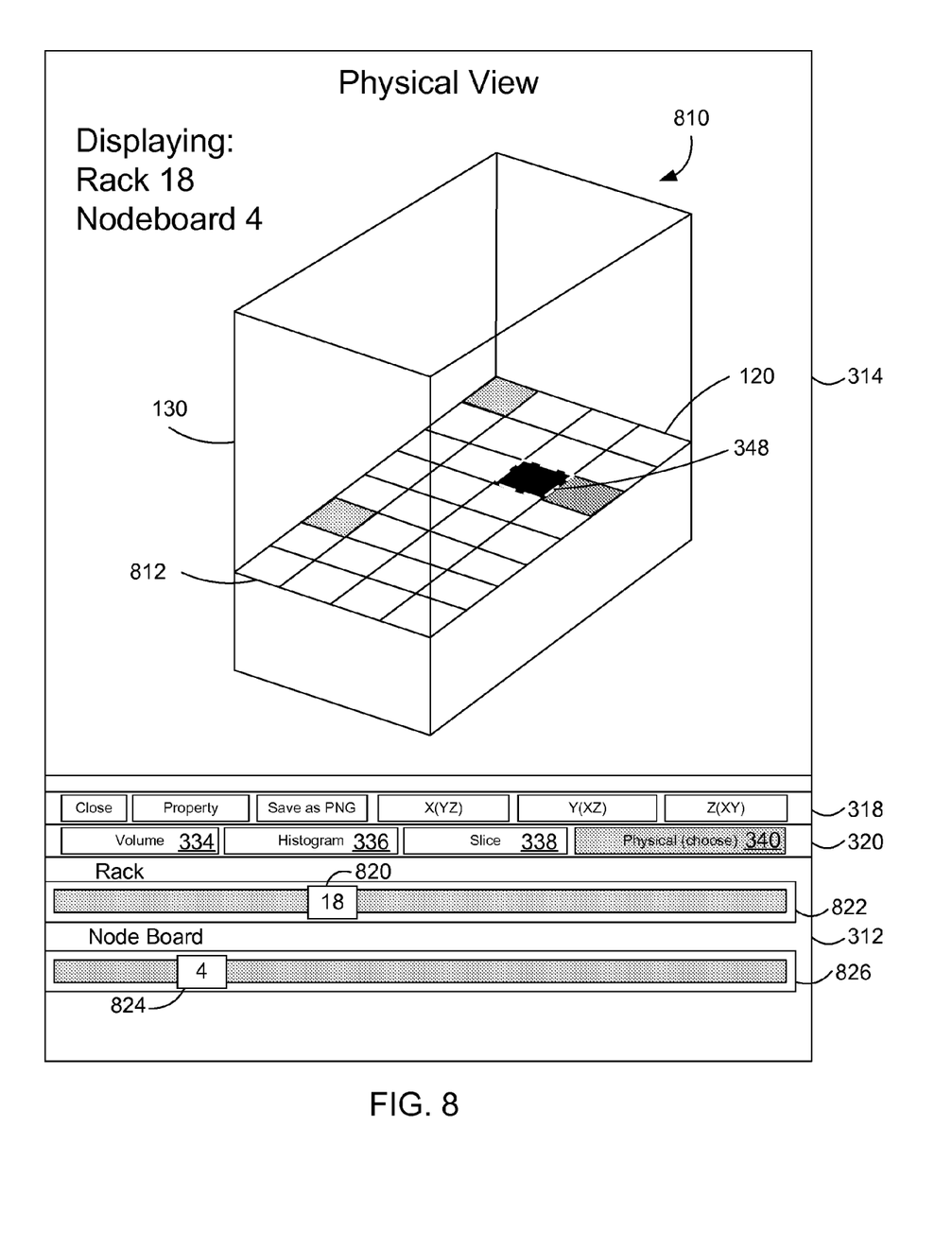
FIG. 8 represents a computer display screen with a property viewer showing a physical view of a massively parallel computer system.

FIG. 8 represents another display of a scalable property viewer for a parallel computer system. In the example of FIG. 8, the physical view 810 has been selected as indicated by the darkened physical view button 340. The physical view 810 is then displayed in the property display area 314. The physical view 810 shows the property elements 812 with respect to their physical location in the computer system. This means that the property elements are shown in their physical relationship to one another rather than their logical relationship as in the previously described views. In this example, the user is able to select the rack 130 and the node board 120 to be displayed in the property display area 314. The user can select the rack 130 with the rack button 820 on the rack slider 822 and the node board 120 with the node button 824 on the node board slider 826.

Again referring to FIG. 8, each property element 812 represents a property such as temperature for a node 110 of a node card 114 (FIG. 1) on a node board 120. The property elements 812 represent the property for the nodes 110 on a node board 120 in their physical layout of 4×8 nodes per node board as the nodes would be visible from the top of the node board 120. This allows the user or system administrator to observe the property for physically adjacent nodes. This may assist in troubleshooting system problems related to the observed property.

Again referring to FIG. 8, a single element 348 is shown highlighted in the property display area 314 of the physical view. This highlighted element corresponds to the highlighted element 348 shown in FIG. 3, meaning they represent the same physical node in the parallel computer system. To assist the user or system administrator in troubleshooting and monitoring the system, the scalable property viewer links the logical view with the physical view. The scalable property viewer allows the user to select and highlight a property element on one display and then move to another display where the same property element will remain highlighted. For example, where the property element 348 is selected in FIG. 3 in either display, the user could then select the physical view which would display the rack and node board with the selected property element as shown in FIG. 8. The user could then select to display the node information as describe above with reference to FIG. 7, or the node information for the selected property element could automatically be displayed.

Figure 9:
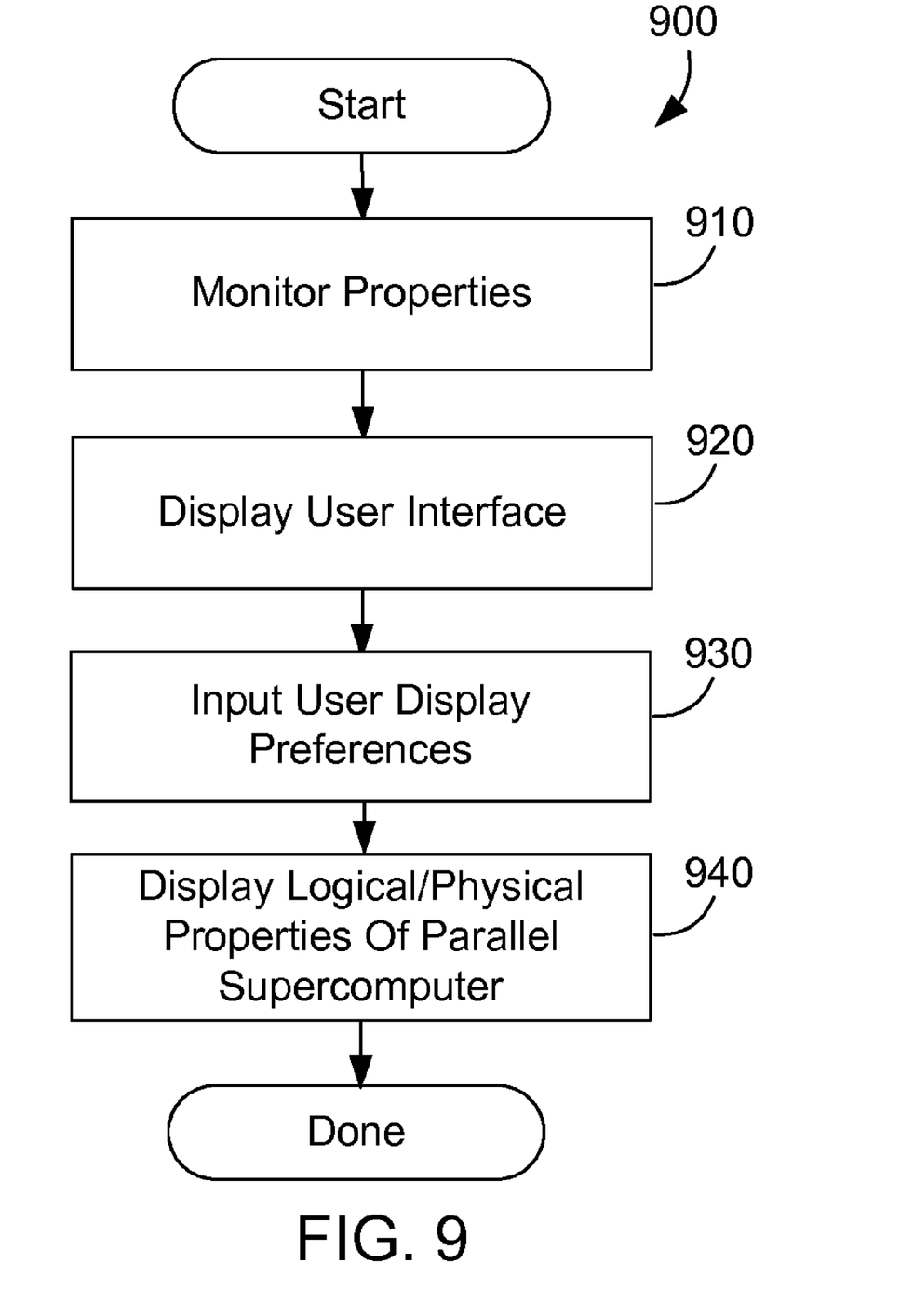
FIG. 9 is a method flow diagram providing a property viewer in a massively parallel computer system.

FIG. 9 shows a method 900 for providing a scalable property monitor in a parallel computer system. This method is performed by software on the service node but may require software and/or hardware on the nodes to gather the required information. In the Blue Gene/L system, the data gathering is done by a prior art data collection mechanism in the service node. For method 900, first, monitor the properties on the nodes (step 910). Next, display a graphical user interface (step 920) and input user display preferences (step 930). Display logical and/or physical views of the properties with the preferences selected by the user (step 940). The method is then done.

The disclosure herein includes a method and apparatus for a scalable property viewer for a massively parallel computer system to view different properties of the computer system with several different types of views. The property viewer allows system administrators to decrease the amount of down time for increased efficiency of the computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A parallel computer system comprising:
a plurality of nodes connected by one or more networks;
a data collection mechanism that collects data concerning at least one property of the nodes;
a scalable property viewer with a graphical user interface that displays the at least one property of the parallel computer system for each of the nodes, where the at least one property for each of the nodes is displayed as a property element on the display with a different color to indicate the state of a property corresponding to the property element;
wherein the at least one property for the plurality of nodes is displayed in a slice view that shows a two dimensional view of a logical slice of the parallel computer system in a plane chosen from the X, Y and Z planes, and wherein the slice view is selectable with an X, Y and Z slide button corresponding to each of the X, Y and Z planes.

2. The parallel computer system of claim 1 wherein the at least one property is chosen from temperature, cache misses, cache hits, FLOPS (floating operations per second), and network traffic.

3. The parallel computer system of claim 1 wherein the at least one property is displayed in a volume view that displays the property elements for each node in a three dimensional volume that represents a logical view of the system.

4. The parallel computer system of claim 3 wherein a plurality of property elements in the volume view that have a nominal value are displayed in a transparent color and a plurality of property elements that have a non-nominal value are displayed in a non-transparent color.

5. The parallel computer system of claim 1 wherein the property elements are displayed in a physical view of the system that corresponds to the physical layout of the computer system's hardware.

6. The parallel computer system of claim 1 wherein the property elements are displayed in a logical view of the system, and wherein the logical view is linked to a physical view of the system that shows the elements in a layout that corresponds to the physical layout of the nodes in the parallel computer system and the graphical user interface provides a selection to display the corresponding physical view of an element displayed in the logical view.

7. The parallel computer system of claim 1 wherein the parallel computer system is a massively parallel computer system with the nodes interconnected by a three dimensional torus network.

8. A computer implemented method for a scalable property viewer, where the method comprises the steps of:
monitoring the nodes of a parallel computer system;
displaying a graphical user interface;
inputting user preferences to modify the graphical user interface;
displaying on the graphical user interface at least one property of the parallel computer system for each of the nodes in a slice view that shows a two dimensional view of a logical slice of the parallel computer system in a plane chosen from the X, Y and Z planes wherein the slice view is selectable with an X Y and Z slide button corresponding to each of the X, Y and Z planes, and where the at least one property for each of the nodes is displayed as a property element on the display with a different color to indicate the state of the property for that element.

9. The computer implemented method of claim 8 wherein the at least one property is chosen from temperature, cache misses, cache hits, FLOPS (floating operations per second), and network traffic.

10. The computer implemented method of claim 8 wherein the step of displaying at least one property further comprises the step of displaying a volume view that displays the property elements for each node in a three dimensional volume that represents a logical view of the system.

11. The computer implemented method of claim 10 wherein a plurality of property elements in the volume view that have a nominal value are displayed in a transparent color and a plurality of property elements that have a non-nominal value are displayed in a non-transparent color.

12. The computer implemented method of claim 8 wherein the step of displaying at least one property further comprises the step of displaying a physical view of the system where the property elements are shown in a layout that corresponds to the physical layout of the nodes in the parallel computer system hardware.

13. A program product, comprising a tangible computer storage media having a computer readable program code embodied therein said computer readable code adapted to be executed on a computer system to implement a method for a scalable property viewer, said method comprising:
- monitoring a plurality of nodes of a parallel computer system;
- displaying a graphical user interface;
- inputting user preferences to modify the graphical user interface; and
- displaying on the graphical user interface at least one property of the parallel computer system for each of the nodes in a slice view that shows a two dimensional view of a logical slice of the parallel computer system in a plane chosen from the X, Y and Z planes, wherein the slice view is selectable with an X, Y and Z slide button corresponding to each of the X, Y and Z planes, and where the at least one property for each of the nodes is displayed as a property element on the display with a different color to indicate the state of the property for that element.

14. The program product of claim 13 wherein the at least one property is chosen from temperature, cache misses, cache hits, FLOPS (floating operations per second), and network traffic.

15. The program product of claim 13 wherein the at least one property is displayed in a volume view that displays the property elements for each node in a three dimensional volume that represents a logical view of the system.

16. The program product of claim 15 wherein the property elements in the volume view that have a nominal value are displayed in a transparent color and property elements that have a non-nominal value are displayed in a non-transparent color.

17. The program product of claim 13 wherein the at least one property is displayed in a physical view that displays the property elements for each node of the system in a location on the display that corresponds to the physical layout of the computer system's hardware.

18. The program product of claim 13 wherein the at least one property is displayed in a logical view of the system, and wherein the logical view is linked to a physical view of the system that shows the elements in a layout that corresponds to the physical layout of the nodes in the parallel computer system and the graphical user interface provides a selection to display the corresponding physical view of an element displayed in the logical view.

19. The program product of claim 13 wherein the parallel computer system is a massively parallel computer system with the nodes interconnected by a three dimensional torus network.

* * * * *